United States Patent
Igeta et al.

(10) Patent No.: US 7,777,842 B2
(45) Date of Patent: Aug. 17, 2010

(54) TRANSFLECTIVE LIQUID CRYSTAL DISPLAY DEVICE HAVING A REGION HAVING NEITHER A LIGHT-SHIELDING FILM NOR A COLOR FILTER BETWEEN REFLECTIVE SECTIONS OF ADJACENT SUBPIXELS

(75) Inventors: Koichi Igeta, Chiba (JP); Junji Tanno, Chiba (JP); Hirotaka Imayama, Mobara (JP); Tetsuya Nagata, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 99 days.

(21) Appl. No.: 11/745,776

(22) Filed: May 8, 2007

(65) Prior Publication Data

US 2007/0263143 A1 Nov. 15, 2007

(30) Foreign Application Priority Data

May 10, 2006 (JP) .............................. 2006-131299

(51) Int. Cl.
*G02F 1/1335* (2006.01)
*G02F 1/1333* (2006.01)

(52) U.S. Cl. ...................... 349/114; 349/106; 349/110; 349/113

(58) Field of Classification Search ......... 349/114–116, 349/109
See application file for complete search history.

(56) References Cited

U.S. PATENT DOCUMENTS

| 6,215,538 | B1 * | 4/2001 | Narutaki et al. ............. 349/106 |
| 6,249,326 | B1 * | 6/2001 | Hebiguchi ................... 349/42 |
| 6,914,656 | B2 | 7/2005 | Sakamoto et al. |
| 6,970,222 | B2 * | 11/2005 | Nakayoshi et al. .......... 349/139 |
| 2003/0025859 | A1 * | 2/2003 | Moon et al. .................. 349/113 |
| 2005/0064306 | A1 * | 3/2005 | Katagami et al. .............. 430/7 |
| 2005/0078255 | A1 * | 4/2005 | Hiroshi ........................ 349/141 |
| 2005/0264731 | A1 * | 12/2005 | Itou et al. .................... 349/114 |
| 2005/0275785 | A1 * | 12/2005 | Maeda et al. ................ 349/143 |
| 2007/0236635 | A1 * | 10/2007 | Morimoto et al. ........... 349/114 |

FOREIGN PATENT DOCUMENTS

JP 2003-344837 12/2003

* cited by examiner

*Primary Examiner*—Andrew Schechter
*Assistant Examiner*—Michael Inadomi
(74) *Attorney, Agent, or Firm*—Antonelli, Terry, Stout & Kraus, LLP.

(57) ABSTRACT

To improve the reflectivity or the transmissivity significantly, there is provided a liquid crystal display device including a liquid crystal display panel having a pair of substrates and liquid crystal sandwiched between the pair of substrates. The liquid crystal display panel includes a plurality of subpixels each having an active element, a pixel electrode, and a counter electrode, in which an electric field is generated by the pixel electrode and the counter electrode to drive the liquid crystal. The liquid crystal display device includes a light-shielding film and a color filter formed on a first substrate of the pair of substrates, a scanning line for supplying the active element with a scanning voltage, the scanning line being formed on a second substrate of the pair of substrates. The boundary region between the subpixels adjacent along the scanning line has no light-shielding film and no color filter.

13 Claims, 16 Drawing Sheets

| Fig. 23 | Fig. 31 | Fig. 1 | Fig. 5 |
|---------|---------|--------|--------|
| 1       | 1.01    | 2.00   | 1.70   |

US 7,777,842 B2

TRANSFLECTIVE LIQUID CRYSTAL DISPLAY DEVICE HAVING A REGION HAVING NEITHER A LIGHT-SHIELDING FILM NOR A COLOR FILTER BETWEEN REFLECTIVE SECTIONS OF ADJACENT SUBPIXELS

The present application claims priority from Japanese applications JP2006-131299 filed on May 10, 2006, the content of which is hereby incorporated by reference into this application.

BACKGROUND OF THE INVENTION

1. Field of the Invention

The present invention relates to a liquid crystal display device, and more particularly, to a liquid crystal display device with improved reflectivity and transmissivity.

2. Description of the Related Art

For example, partial transmissive-type liquid crystal display devices that have a transmitting section and a reflecting section in one subpixel are used as displays for mobile phones, as described in JP-A-2003-344837.

FIG. 23 is a plan view of an example of a subpixel of a known partial transmissive-type liquid crystal display device. FIG. 24 is a sectional view taken along line A-A' of FIG. 23. FIG. 25 is a sectional view taken along line B-B' of FIG. 23. FIG. 26 is a sectional view taken along line C-C' of FIG. 23.

Referring to FIG. 23, reference numeral 30 denotes a transmitting section and numeral 31 denotes a reflecting section. FIG. 25 shows a cross section of the transmitting section 30. FIG. 26 shows a cross section of the reflecting section 31. The partial transmissive-type liquid crystal display device shown in FIG. 23 is viewed from the main surface of a glass substrate SUB2.

Referring to FIGS. 23 to 26, symbols SUB1 and SUB2 indicate a glass substrate, RET indicates a retarder, GI indicates a gate insulating film, PAS1 to PAS4 indicate an insulating film, POL1 and POL2 indicate a polarizer, BM indicates a black matrix, CFR, CFG, and CFB indicate a color filter, OC indicates a protection layer, MR indicates a recessed layer, AL1 and AL2 indicate an alignment layer, RAL indicates a reflecting electrode, LC indicates a liquid crystal layer, PIX indicates a pixel electrode, COM indicates an counter electrode, GL indicates a scanning line (a gate line), and DL indicates a video line (a drain line or a source line).

The known partial transmissive-type liquid crystal display device shown in FIG. 23 has the pixel electrode PIX and the planar counter electrode COM deposited with an interlayer insulating film PAS2 sandwiched therebetween, in which arch electric flux lines formed between the pixel electrode PIX and the counter electrode COM are distributed in such a manner as to pass through the liquid crystal layer LC to change the orientation of the liquid crystal layer LC.

The pixel electrode PIX is 4 μm in width, and 6 μm in gap width, in which case the density of the lines of electric force and the torque that adjacent lines of electric force apply to the liquid crystal layer LC are maintained in relatively good balance to enable transmission and reflective display.

The length of the cell gap of the reflecting section 31 is set at about half of that of the transmitting section 30. This is for the purpose of substantially matching the optical path lengths of the transmitting section 30 and the reflecting section 31 to each other because light passes through the reflecting section 31 two times to and back.

While the transmitting section 30 shows the brightness of light using the double refraction of the liquid crystal layer LC, the reflecting section 31 shows the brightness using the double refraction of a retarder (½ wave plate) RET and the liquid crystal layer LC disposed in the liquid crystal display panel.

FIG. 27 is a plan view of a TFT substrate side subpixel of an example of a known transmissive liquid crystal display device. FIG. 28 is a plan view of a subpixel in which the TFT substrate shown in FIG. 27 and a CF substrate are placed one on another. FIG. 29 is a sectional view taken along line M-M' of FIG. 28.

Referring to FIGS. 27 and 29, symbols SUB1 and SUB2 indicate a glass substrate, GI indicates a gate insulating film, PAS1 to PAS4 indicate an insulating film, POL1 and POL2 indicate a polarizer, BM indicates a black matrix, CFR, CFG, and CFB indicate a color filter, OC indicates a protection layer, AL1 and AL2 indicate an alignment layer, LC indicates a liquid crystal layer, PIX indicates a pixel electrode, COM indicates an counter electrode, GL indicates a scanning line (a gate line), DL indicates a video line (a drain line or a source line), and CH indicates a contact hole.

The liquid crystal display device shown in FIG. 27 has a comb pixel electrode PIX and a planar counter electrode COM disposed with the interlayer insulating film PAS2 sandwiched therebetween, in which arch electric flux lines formed between the pixel electrode PIX and the counter electrode COM are distributed in such a manner as to pass through the liquid crystal layer LC to change the orientation of the liquid crystal layer LC.

At that time, the density of the lines of electric force and the torque that adjacent lines of electric force apply to the liquid crystal layer LC are maintained in good balance to enable transmissive display.

Here, as a prior art document relevant to the present invention, a following patent document is named.
[Patent document 1] J-P-A-2003-344837

SUMMARY OF THE INVENTION

The partial transmissive-type liquid crystal display device shown in FIG. 23 has vertical and horizontal black matrixes BM at the boundary of adjacent subpixels to prevent light leaks and color mixture. This can prevent light leaks to the adjacent subpixels and color mixture, but decreases the open area ratio.

FIG. 30 shows a graph of the reflectivity distribution along line C-C' of FIG. 23. In FIG. 30, the dotted lines indicate the boundary of subpixels, and the region between the two dotted lines indicates the region of the subpixel.

The graph of FIG. 30 shows that the center of the subpixel has high reflectivity and that the region of the black matrix BM does not contribute to reflective display, thus decreasing the reflectivity.

FIG. 31 is a plan view of a subpixel of the known partial transmissive-type liquid crystal display device shown in FIG. 23 in which the vertical black matrix BM of the reflecting section 31 is removed. FIG. 32 shows a graph of the reflectivity distribution along line D-D' of FIG. 31. In FIG. 32, the dotted lines indicate the boundary of subpixels, and the region between the two dotted lines indicates the region of the subpixel.

In the known partial transmissive-type liquid crystal display device shown in FIG. 31, the vertical black matrix BM of the reflecting section 31 is removed and thus the open area ratio is improved. However, to prevent electric field leaks to the adjacent substrates, the comb pixel electrode PIX has to be separated from the boundary of the subpixels, so that the reflectivity has hardly been improved.

Therefore, in the known partial transmissive-type liquid crystal display device, part of the color filters of the reflecting section 31 is removed to form an empty space, thereby improving the reflectivity.

The known transmissive liquid crystal display device shown in FIG. 27 also has vertical and horizontal black matrixes BM at the boundary of adjacent subpixels to prevent light leaks and color mixture. This can prevent light leaks to the subpixels and color mixture but decreases the open area ratio.

Thus, the known partial transmissive-type liquid crystal display device and the known transmissive liquid crystal display device have low open area ratio because there is a black matrix BM at the boundary of subpixels.

Even if there is no black matrix BM at the boundary of subpixels, the known display devices have the problem of poor reflection characteristic because the boundary of subpixels does not contribute to display.

The invention has been made to solve the above-described problems. Accordingly, it is an object of the invention to provide a technique for significantly improving the reflectivity or transmissivity of a liquid crystal display device.

The above and other objects and novel features of the invention will appear hereinafter from the following detailed description and the accompanying drawings.

A typical example of the invention will be outlined as follows:

In order to improve the reflectivity of a partial transmissive-type liquid crystal display device, it is necessary to increase the number of the comb electrodes of the pixel electrode as much as possible and to arrange the comb electrodes to the ends of the subpixel to the very limit. On the other hand, if the comb electrodes of the pixel electrode is too close to the ends of the subpixel, electric field leaks occur to change the orientation of the liquid crystal of the adjacent subpixels, so that part of the adjacent subpixels will be lit. This is not desirable because it decreases the contrast ratio and color-reproduction range.

To prevent the decrease in contrast ratio and color reproduction range due to electric field leaks, a black matrix is generally disposed at the boundary of pixels to prevent light leaks due to electric field leaks. However, it has the disadvantage of decreasing the open area ratio.

To prevent the decrease in contrast ratio and color reproduction range due to electric field leaks without decreasing the open area ratio, it is desirable that there is no color filter at a portion where the electric field leaks occur.

Thus, the portion of the electric field leaks is displayed in white and therefore no color mixture occurs, and moreover, the reflectivity can be improved because there is no color filter. This applies not only to reflective display but also to transmissive display.

Thus, to improve the reflectivity or transmissivity, the liquid crystal display device according to embodiments of the invention has no color filter and no black matrix at the portion of the boundary of the adjacent subpixels where electric field leaks occur and at least one comb electrode of the pixel electrode at the boundary of the subpixel.

The advantage of the typical example of the invention will be briefly described.

The liquid crystal display device according to embodiments of the invention can significantly improve the reflectivity or transmissivity.

DESCRIPTION OF THE PREFERRED EMBODIMENTS

Figure 1:
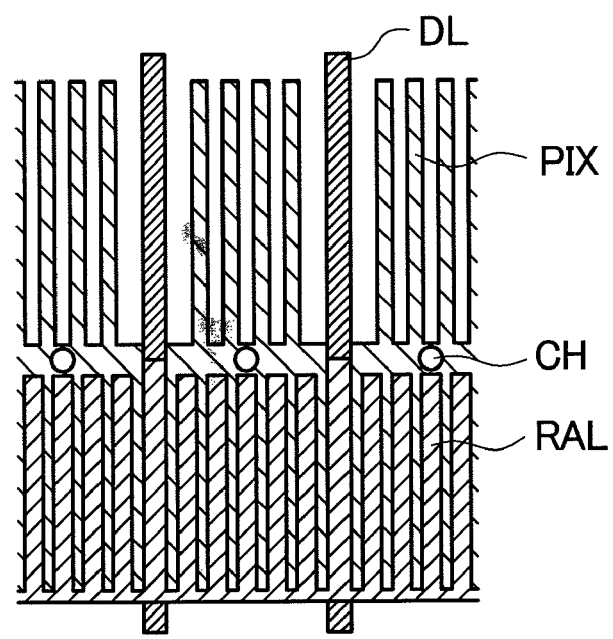
FIG. 1 is a plan view of a TFT substrate side subpixel of a partial transmissive-type liquid crystal display device according to a first embodiment of the invention.

Embodiments of the invention will be described hereinbelow with reference to the drawings, wherein like and corresponding parts in each of the several drawings are identified by the same reference character, and descriptions thereof will be omitted.

First Embodiment

Figure 2:
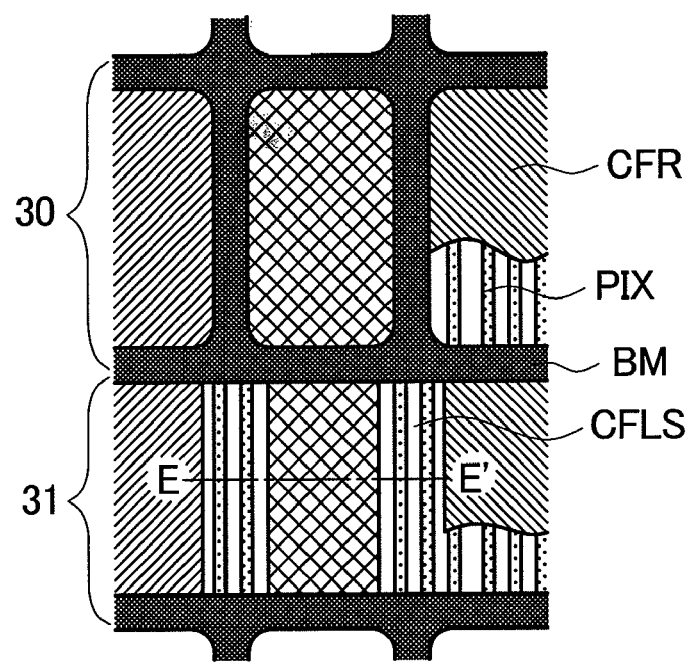
FIG. 2 is a plan view in which the TFT substrate of FIG. 1 and a CF substrate are placed one on another.

FIG. 1 is a plan view of a TFT substrate side subpixel of a partial transmissive-type liquid crystal display device according to a first embodiment of the invention. FIG. 2 is a plan view of the TFT substrate of FIG. 1 and a CF substrate are placed one on another.

Figure 3:
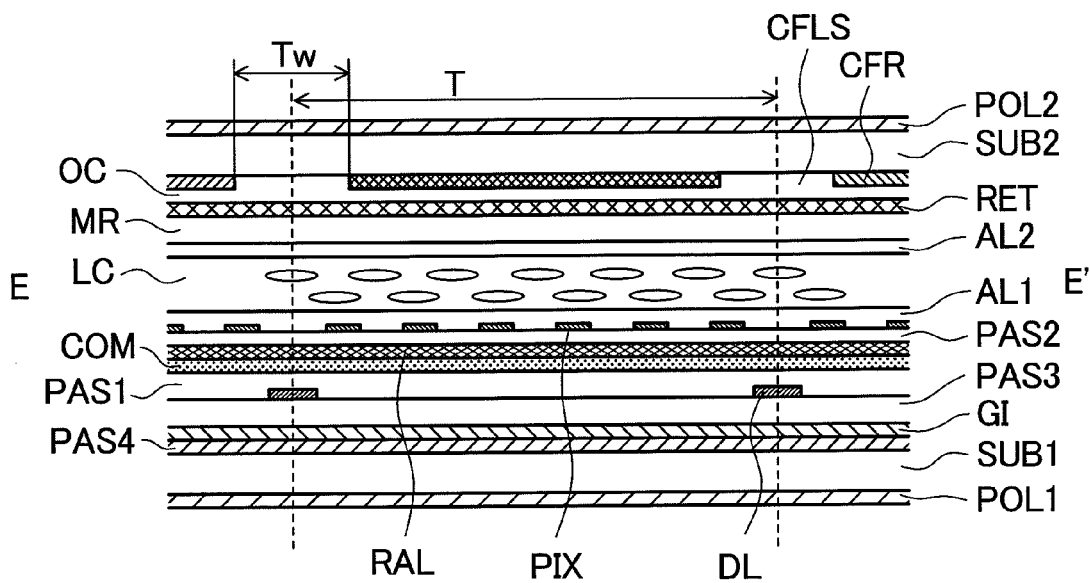
FIG. 3 is a sectional view taken along line E-E' of FIG. 2.
Figure 24:
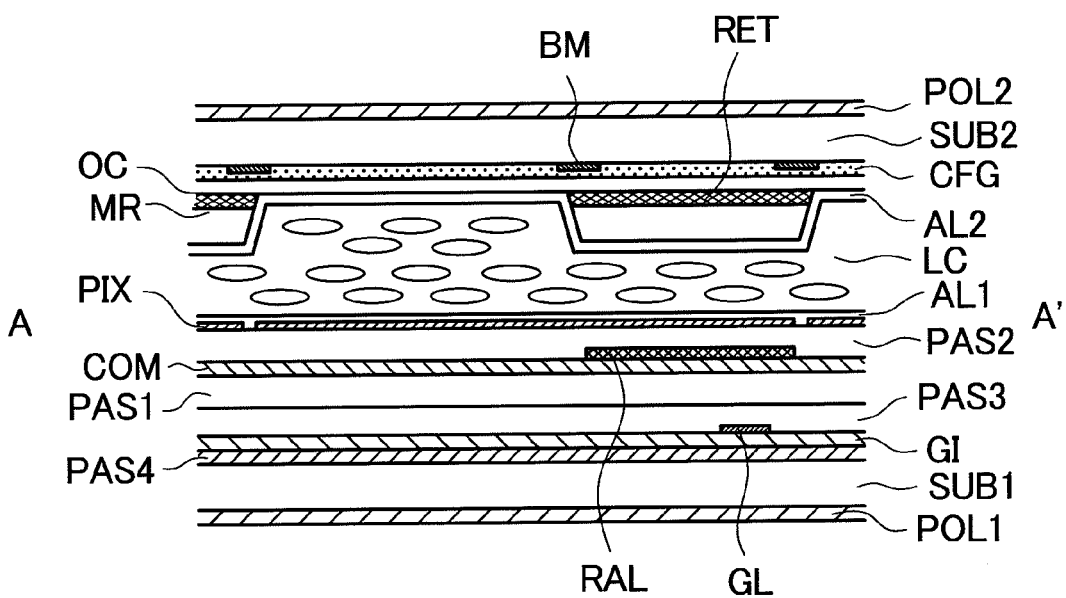
FIG. 24 is a sectional view taken along line A-A' of FIG. 23.
Figure 25:
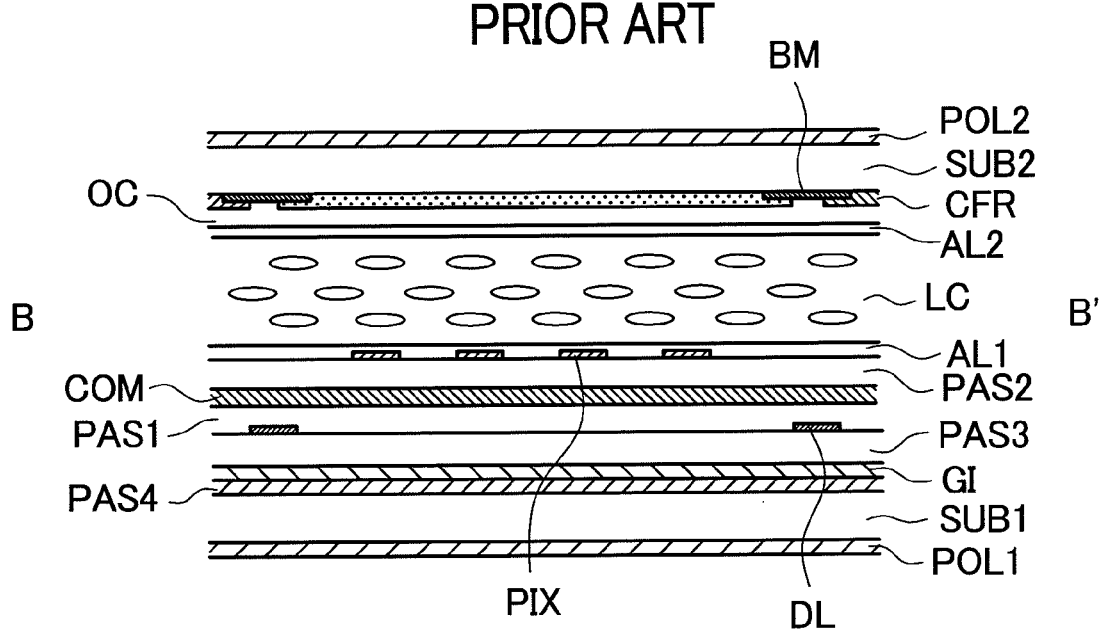
FIG. 25 is a sectional view taken along line B-B' of FIG. 23.
Figure 26:
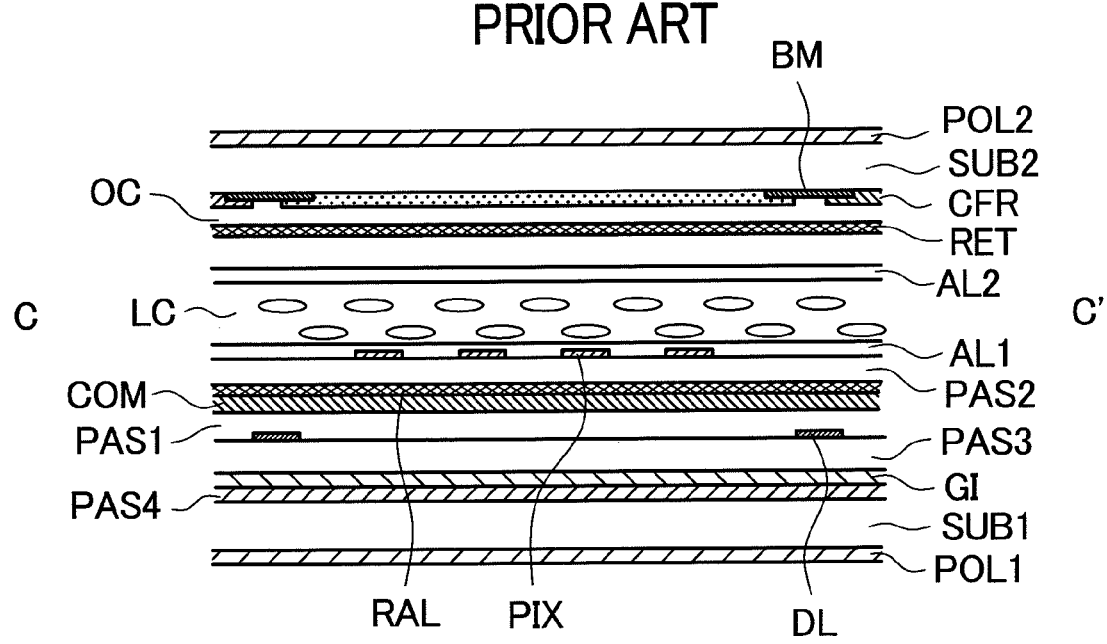
FIG. 26 is a sectional view taken along line C-C' of FIG. 23.
Figure 27:
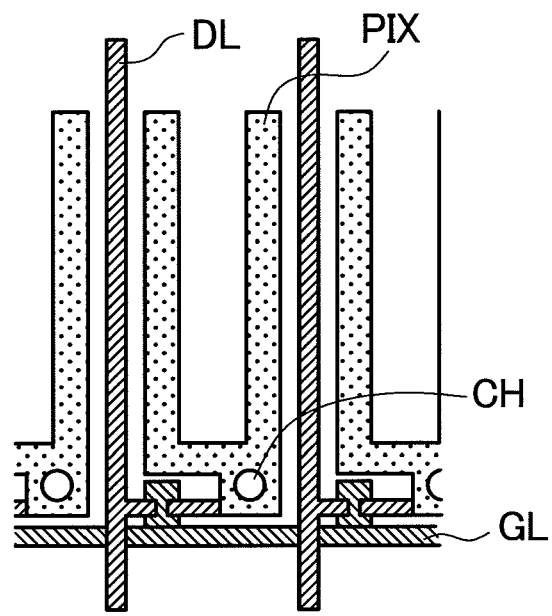
FIG. 27 is a plan view of a TFT substrate side subpixel of an example of a known transmissive liquid crystal display device.
Figure 28:
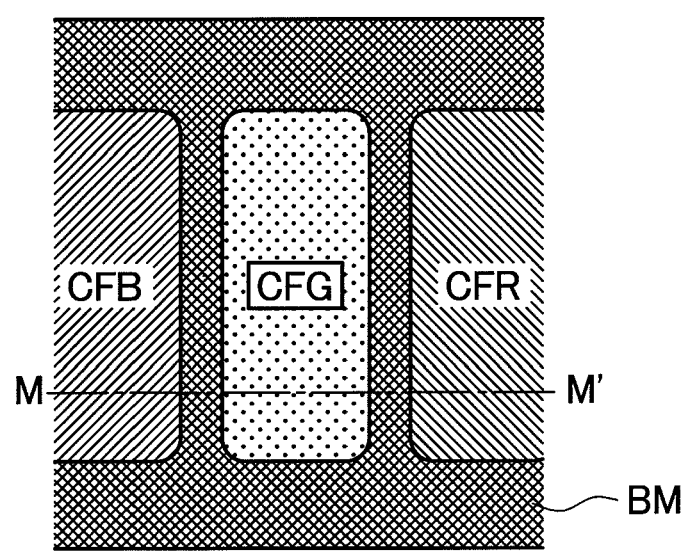
FIG. 28 is a plan view of a subpixel in which the TFT substrate shown in FIG. 27 and a CF substrate are placed one on another.
Figure 29:
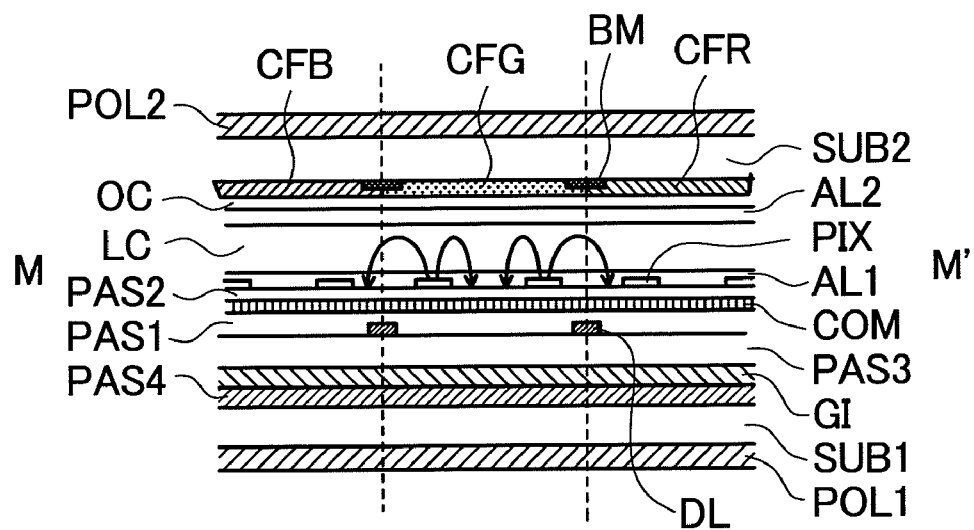
FIG. 29 is a sectional view taken along line M-M' of FIG. 28.
Figure 30:
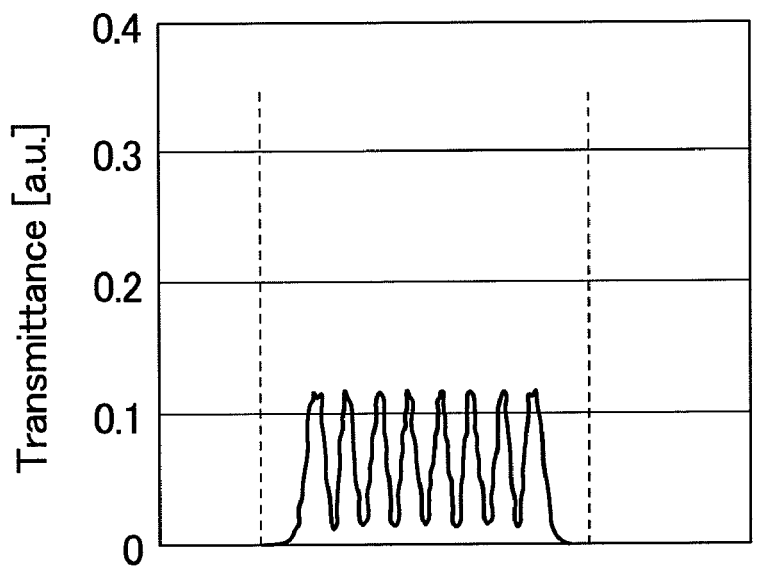
FIG. 30 is a graph showing the reflectivity distribution along line C-C' of FIG. 23.

FIG. 3 is a sectional view taken along line E-E' of FIG. 2. In FIG. 2, a reflecting electrode RAL is not shown. The longitudinal section and the cross section of the transmitting section 30 of this embodiment are the same as those of FIGS. 24 and 25.

The partial transmissive-type liquid crystal display device according to the embodiment has a pair of glass substrates SUB1 and SUB2 with a liquid crystal layer LC sandwiched therebetween. This partial transmissive-type liquid crystal display device is viewed from the main surface of the glass substrate SUB2.

The glass substrate SUB2 (also referred to as a CF substrate) has, on the liquid crystal layer side, a black matrix BM, red, green, and blue color filter layers CFR, CFG, and CFB, a protection layer OC, a retarder (½ wave plate) RET for changing the polarization of light, a recessed layer MR, and an alignment layer AL2 in that order from the glass substrate SUB2 to the liquid crystal layer LC. The glass substrate SUB2 also has a polarizer POL2 on the outside.

The glass substrate SUB1 (also referred to as a TFT substrate) has, on the liquid crystal layer side, an insulating film PAS4, a gate insulating film GI, a scanning line (also referred to as a gate line) GL, an interlayer insulating film PAS3, a video line (also referred to as a source line or a drain line) DL, an interlayer insulating film PAS1, an counter electrode COM (also referred to as a common electrode), a reflecting electrode RAL, an interlayer insulating film PAS2, a pixel electrode PIX, and an alignment layer AL1 in that order from the glass substrate SUB1 to the liquid crystal layer LC. The glass substrate SUB1 also has a polarizer POL1 on the outside.

The counter electrode COM has a planer shape. The pixel electrode PIX and the counter electrode COM are superposed one on another. The pixel electrode PIX and the counter electrode COM are made of a transparent conductive layer, such as indium tin oxide (ITO), thereby forming a retention volume. The interlayer insulating film PAS2 may not necessarily have one layer but may have two or more layer.

The reflecting section 31 has a reflecting electrode RAL. The reflecting electrode RAL may be a metal film made of aluminum (Al) or the like or of a two-layer structure made of lower-layer molybdenum (Mo) and upper-layer aluminum (Al).

The partial transmissive-type liquid crystal display device of this embodiment also has the pixel electrode PIX and the planar counter electrode COM deposited with an interlayer insulating film PAS2 sandwiched therebetween, in which arch electric flux lines formed between the pixel electrode PIX and the counter electrode COM are distributed in such a manner as to pass through the liquid crystal layer LC to change the orientation of the liquid crystal layer LC.

The length of the cell gap of the reflecting section 31 is set at about half of that of the transmitting section 30. This is for the purpose of substantially matching the optical path lengths and the transmitting section 30 and the reflecting section 31 because light passes through the reflecting section 31 two times to and back.

While the transmitting section 30 shows the brightness of light using the double refraction of the liquid crystal layer LC, the reflecting section 31 shows the brightness using the double refraction of a retarder (½ wave plate) RET and the liquid crystal layer LC disposed in the liquid crystal display panel.

In this embodiment, the pixel electrode PIX of the transmitting section 30 is 4 μm in width, and 6 μm in gap width, while the pixel electrode PIX of the reflecting section 31 is 3.5 μm in width, and 4.5 μm in gap width. The two opposite comb electrodes of the pixel electrode PIX of the reflecting section 31 are disposed in the vicinity of the adjacent subpixels to apply lines of electric force to the adjacent subpixels. Therefore, in this embodiment, the number of the comb electrodes of the pixel electrode PIX of the reflecting section 31 is six, which is more than the number, four, of the comb electrodes of the pixel electrode PIX of the transmitting section 30.

In this case, it is preferable that the distance between the comb electrode nearest to the video line DL among the plurality of comb electrodes of the pixel electrode PIX of the reflecting section 31 and the center of the video line DL be within 6 μm, preferably within 5 μm, and more preferably within 4 μm.

This arrangement of the comb electrodes of the pixel electrode PIX allows all the area of the reflecting section 31 to be lit, thus offering a significant advantage in improving reflectivity.

Furthermore, for monochromatic display of one subpixel, part of the adjacent subpixels can also be used for reflective display, which is very effective in improving reflectivity.

In this embodiment, there are no color filter and no black matrix BM at the boundary of the subpixels of the reflecting section 31. The elimination of the color filter and the black matrix BM at the boundary of the subpixels of the reflecting section 31 to form an empty space CFLS prevents color mixture even if lines of electric force are applied to the adjacent subpixels, thereby preventing a decrease in contrast ratio and color reproduction range.

Combining the arrangement of the comb electrodes of the pixel electrode PIX and the region having no color filter (the color-filter empty space CFLS) can significantly improve the reflectivity while preventing a decrease in contrast ratio and color reproduction range.

To further improve the reflectivity, it is preferable that the color-filter empty space CFLS have at least part of the comb electrodes of the pixel electrode PIX.

This is because the edge of the comb electrodes of the pixel electrode PIX has the highest reflection efficiency. Therefore, arranging at least the edge of the electrode in the color-filter empty space CFLS improves the reflection efficiency.

Figure 4:
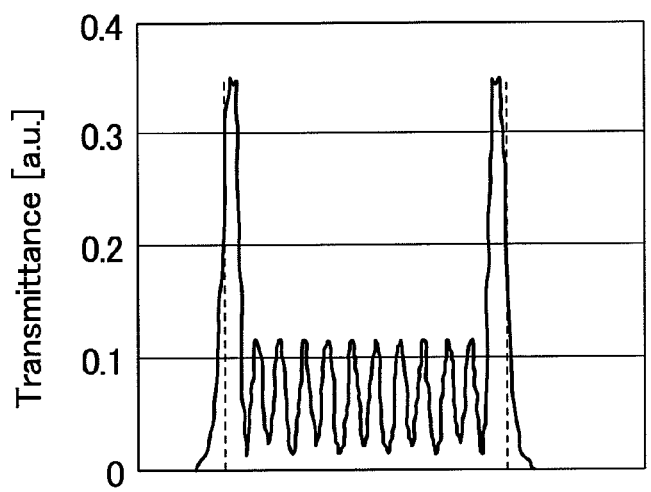
FIG. 4 is a graph showing the reflectivity distribution along line E-E' of FIG. 2.

FIG. 4 shows a graph of the reflectivity distribution along line E-E' of FIG. 2. In FIG. 4, the dotted lines indicate the boundary of subpixels, in which the region between the two dotted lines indicates the region of the subpixel.

In FIG. 4 and the drawings to be described later, the boundary of subpixels is in the center of the video line DL shown in FIG. 3.

The graph of FIG. 4 shows that the center of the subpixel has uniform reflectivity and that the color-filter empty space CFLS has significantly increased in reflectively. It is preferable that $T/10 \leq Tw \leq T/1.5$ holds where Tw is the width of the color-filter empty space CFLS and T is the distance between the video lines DL in FIG. 3.

The graph also shows that since the comb electrodes of the pixel electrode PIX are disposed to the ends of the subpixel, part of the adjacent subpixels also contributes to reflection. In this case, the lighting part of the adjacent subpixels has no color filter, so that the contrast ratio and color reproduction range are not decreased by color mixture.

COMPARATIVE EXAMPLE

Figure 5:
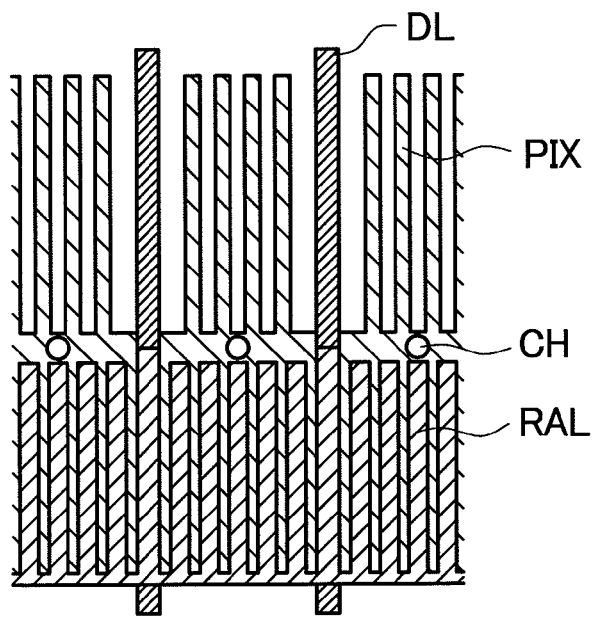
FIG. 5 is a plan view of a TFT substrate side subpixel of a partial transmissive-type liquid crystal display device according to a comparative example.
Figure 6:
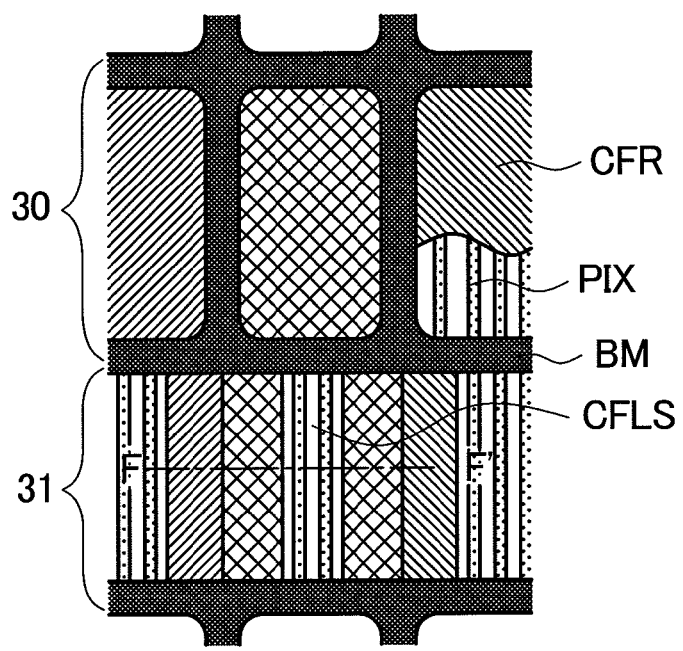
FIG. 6 is a plan view in which the TFT substrate of FIG. 5 and a CF substrate are placed one on another.

FIG. 5 is a plan view of a TFT substrate side subpixel of a partial transmissive-type liquid crystal display device according to a comparative example. FIG. 6 is a plan view in which the TFT substrate of FIG. 5 and a CF substrate are placed one on another.

Figure 7:
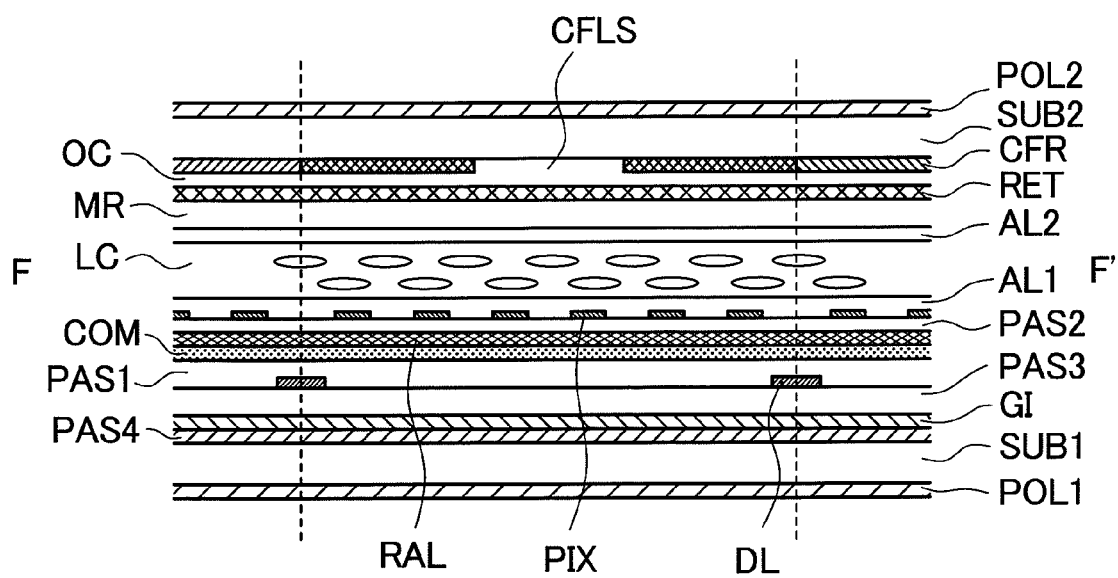
FIG. 7 is a sectional view taken along line F-F' of FIG. 6.

FIG. 7 is a sectional view taken along line F-F' of FIG. 6. In FIG. 6, a reflecting electrode RAL is not shown. The longitudinal section of the partial transmissive-type liquid crystal display device of the comparative example and the cross section of the transmitting section 30 shown in FIGS. 5 and 6 are the same as those of FIGS. 24 and 25.

In the comparative example, the color-filter empty space CFLS of the reflecting section 31 is disposed in the center of the pixel, unlike the first embodiment.

Figure 8:
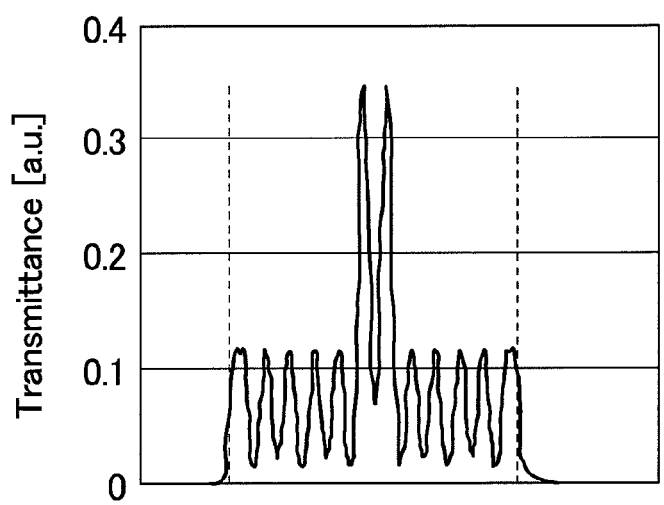
FIG. 8 is a graph showing the reflectivity distribution along line F-F' of FIG. 6.

FIG. 8 shows a graph of the reflectivity distribution along line F-F' of FIG. 6. In FIG. 8, the dotted lines indicate the boundary of subpixels, and the region between the two dotted lines indicates the region of the subpixel.

The graph of FIG. 8 shows that the central color-filter empty space CFLS has significantly improved in reflectivity and that the lines of electric force leak to the adjacent subpixels.

In this case, the contrast ratio and color reproduction range are decreased by color mixture since the adjacent subpixels have a color filter of a different color.

Figures 9, 10:
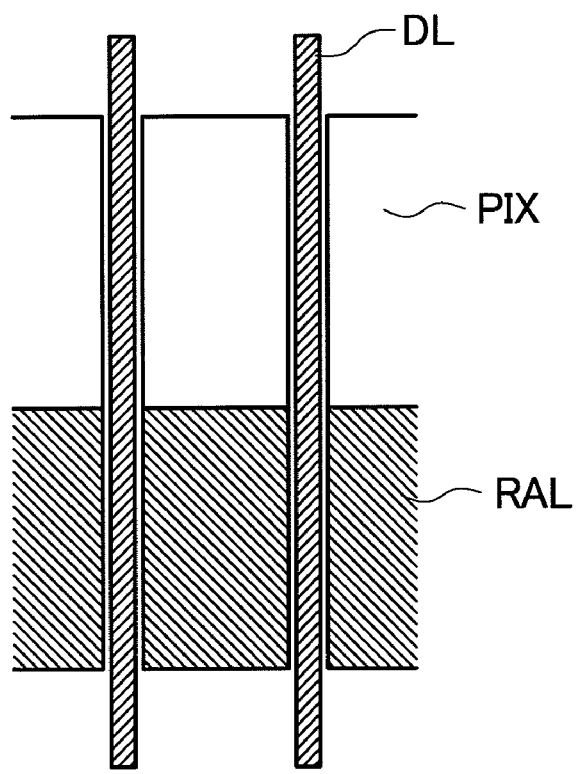
FIG. 9 is a table showing relative values of the known partial transmissive-type liquid crystal display device of FIG. 23, the known partial transmissive-type liquid crystal display device of FIG. 31, the partial transmissive-type liquid crystal display device of the embodiment in FIG. 1, and the partial transmissive-type liquid crystal display device of the comparative example in FIG. 5.
FIG. 10 is a plan view of a TFT substrate side subpixel of a partial transmissive-type liquid crystal display device according to a second embodiment of the invention.
Figure 23:
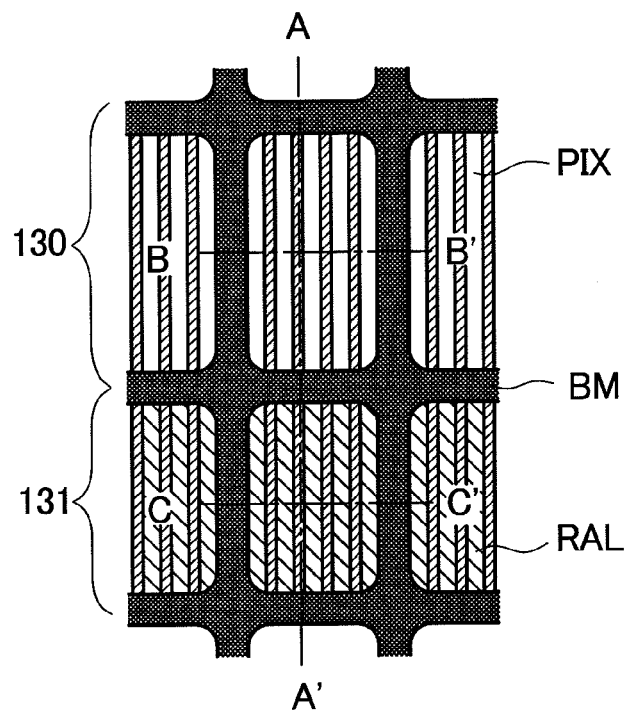
FIG. 23 is a plan view of an example of a subpixel of a known partial transmissive-type liquid crystal display device.
Figure 31:
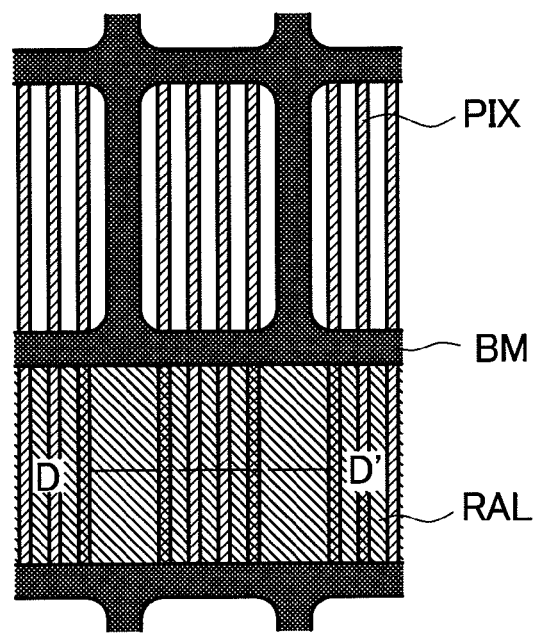
FIG. 31 is a plan view of a subpixel of the known partial transmissive-type liquid crystal display device shown in FIGS. 23 to 26 in which the vertical black matrix of the reflecting section is removed.
Figure 32:
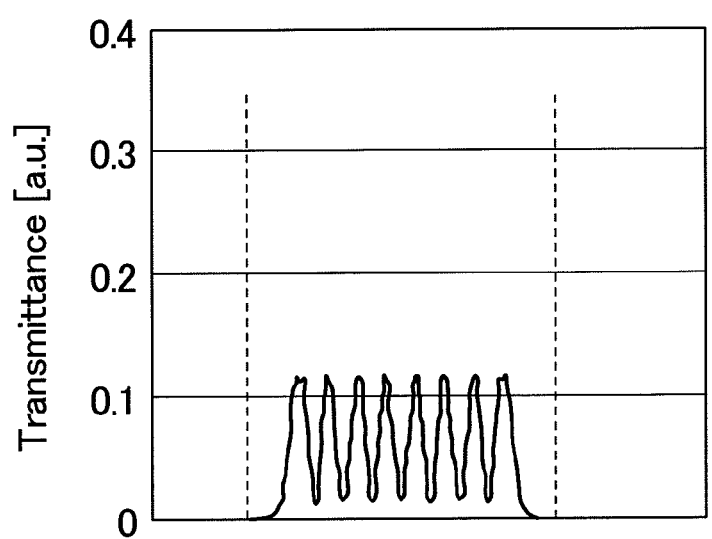
FIG. 32 is a graph showing the reflectivity distribution along line D-D' of FIG. 31.

FIG. 9 shows a table of relative values of the known partial transmissive-type liquid crystal display device of FIG. 23, the known partial transmissive-type liquid crystal display device of FIG. 31, the partial transmissive-type liquid crystal display device of the embodiment in FIG. 1, and the partial transmissive-type liquid crystal display device of the comparative example in FIG. 5.

As shown in FIG. 9, the partial transmissive-type liquid crystal display device of the first embodiment is considerably improved in reflectivity in comparison with the known partial transmissive-type liquid crystal display of FIG. 23, the known partial transmissive-type liquid crystal display device of FIG. 31 and the comparative partial transmissive-type liquid crystal display device of FIG. 5.

In this embodiment, not only the reflecting section 31 but also the transmitting section 30 can be considerably improved in reflectivity while the decrease of the contrast ratio and color reproduction range is prevented by the combination of the arrangement of the comb electrodes of the pixel electrode PIX and the color-filter empty space CFLS.

Second Embodiment

Figure 11:
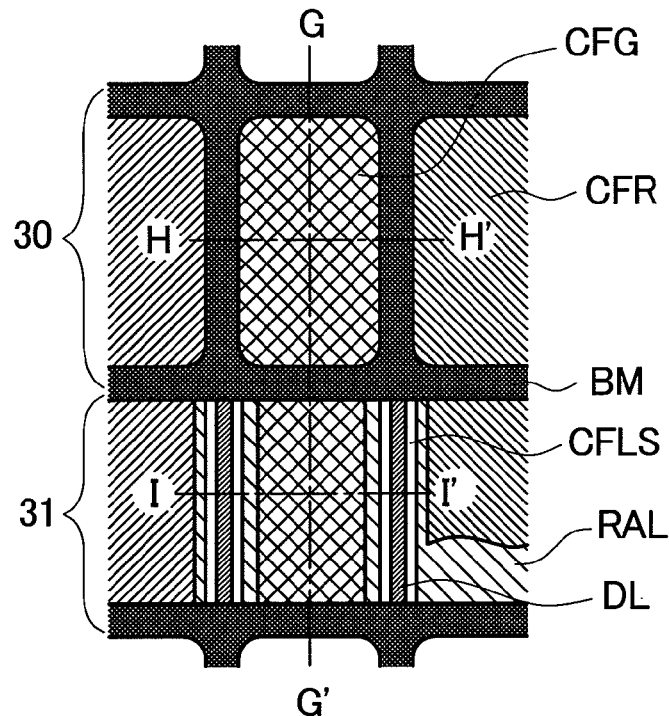
FIG. 11 is a plan view in which the TFT substrate of FIG. 10 and a CF substrate are placed one on another.
Figure 12:
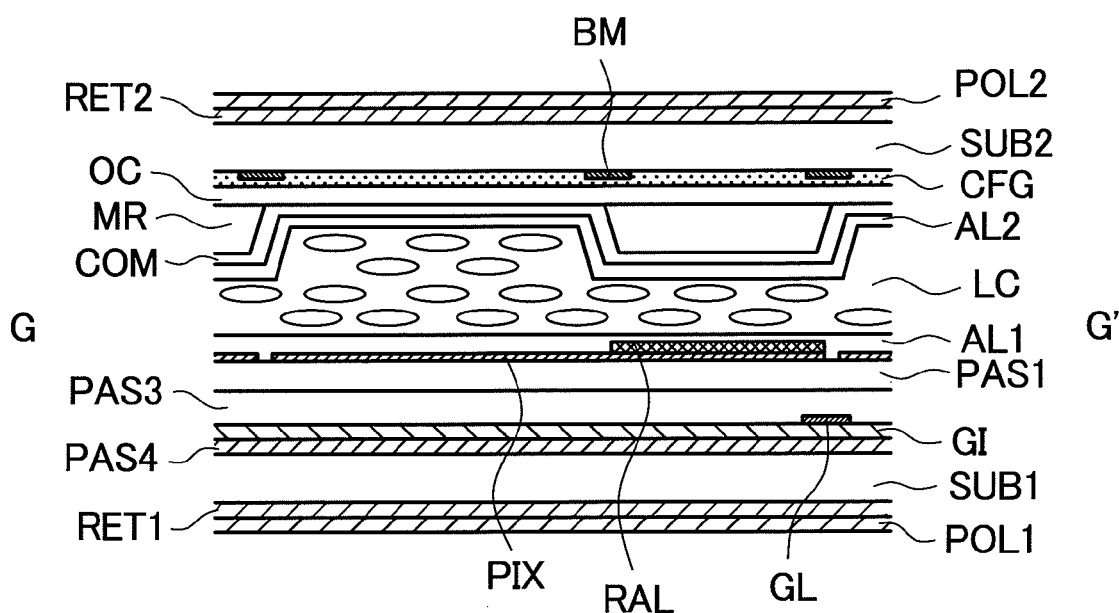
FIG. 12 is a sectional view taken along line G-G' of FIG. 11.
Figure 13:
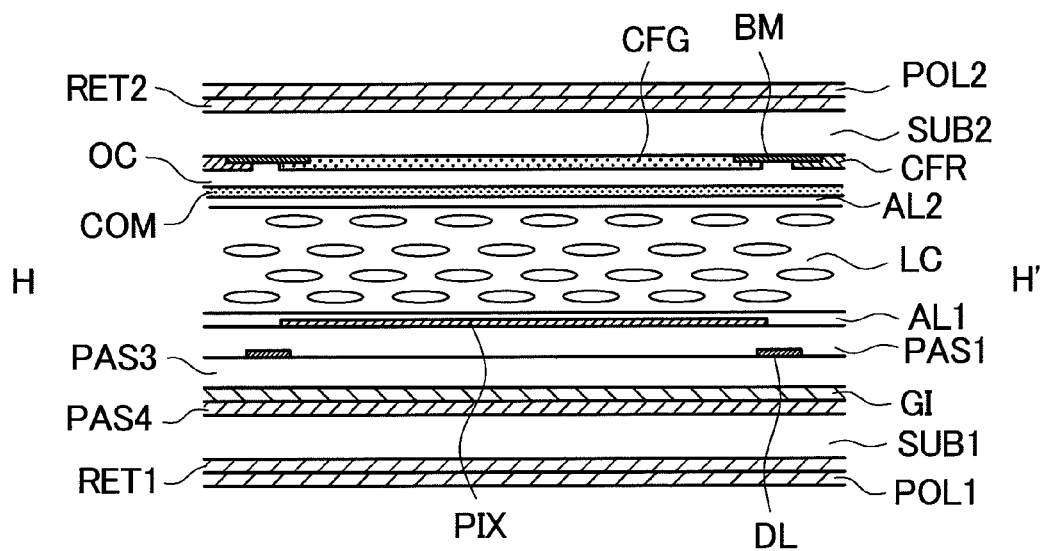
FIG. 13 is a sectional view taken along line H-H' of FIG. 11.
Figure 14:
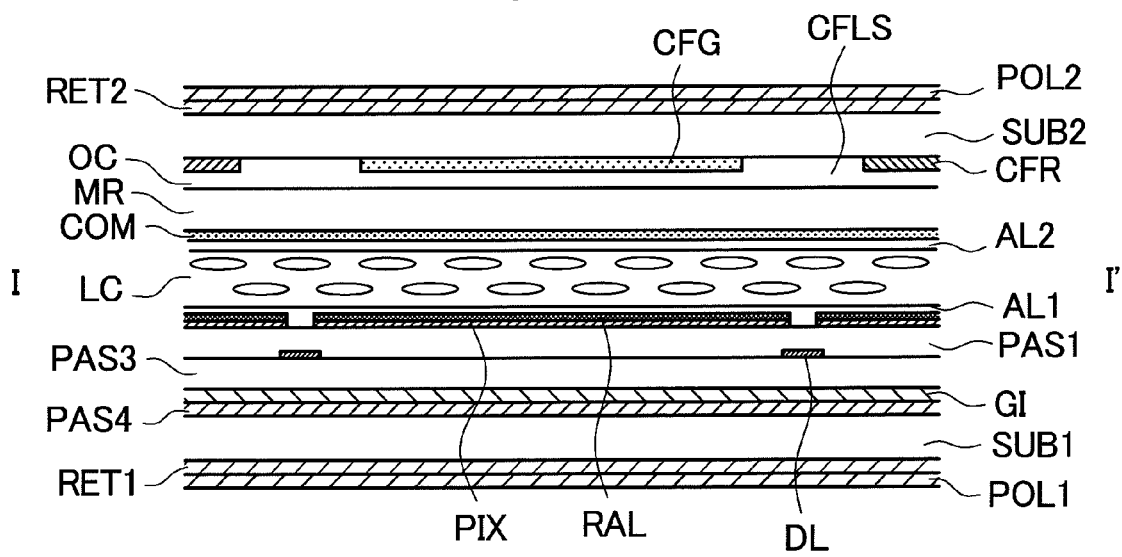
FIG. 14 is a sectional view taken along line I-I' of FIG. 11.

FIG. 10 is a plan view of a TFT substrate side subpixel of a partial transmissive-type liquid crystal display device according to a second embodiment of the invention. FIG. 11 is a plan view in which the TFT substrate of FIG. 10 and a CF substrate are placed one on another. FIG. 12 is a sectional view taken along line G-G' of FIG. 11. FIG. 13 is a sectional view taken along line H-H' of FIG. 11. FIG. 14 is a sectional view taken along line I-I' of FIG. 11.

The partial transmissive-type liquid crystal display device of the embodiment is an electrically controlled birefringence (ECB) (a vertical electric field mode) partial transmissive-type liquid crystal display device (with a positive dielectric anisotropy). In FIG. 11, reference numeral 30 denotes a transmitting section and 31 denotes a reflecting section.

The partial transmissive-type liquid crystal display device of this embodiment has a pair of glass substrates SUB1 and SUB2 with a liquid crystal layer LC sandwiched therebetween. This partial transmissive-type liquid crystal display device is viewed from the main surface of the glass substrate SUB2 (also referred to as a CF substrate).

The glass substrate SUB2 has, on the liquid crystal layer side, a black matrix BM, red, green, and blue color filter layers CFR, CFG, and CFB, a protection layer OC, a recessed layer MR, an counter electrode COM (also referred to as a common electrode), and an alignment layer AL2 in that order from the glass substrate SUB2 to the liquid crystal layer LC. The glass substrate SUB2 also has a retarder RET2, and a polarizer POL2 on the outside.

The glass substrate SUB1 (also referred to as a TFT substrate) has, on the liquid crystal layer side, an insulating film PAS4, a gate insulating film GI, a scanning line (also referred to as a gate line) GL, an interlayer insulating film PAS3, a video line (also referred to as a source line or a drain line) DL, an interlayer insulating film PAS1, a pixel electrode PIX, a reflecting electrode RAL, and an alignment layer AL1 in that order from the glass substrate SUB1 to the liquid crystal layer LC. The glass substrate SUB1 also has a retarder RET1 and a polarizer POL1 on the outside.

In this embodiment, the planar pixel electrode PIX is provided on the glass substrate SUB1 side, while the planar common counter electrode COM is provided on the glass substrate SUB2 side, and the vertical electric field is formed between the pixel electrode PIX and the counter electrode COM to change the orientation of the liquid crystal layer LC. The initial horizontal orientation of liquid crystal layer LC is changed by the vertical electric field to the direction of the vertical electric field.

There are the retarder RET1 and the polarizer POL1 outside the glass substrate SUB1, while there are the retarder RET2 and the polarizer POL2 outside the glass substrate SUB2. The transmitting section 30 and the reflecting section 31 show the brightness of light using the double refraction of the retarders RET1 and RET2 and the liquid crystal layer LC.

The length of the cell gap of the reflecting section 31 is set at about half of that of the transmitting section 30. This is for the purpose of substantially matching the optical path lengths of the transmitting section 30 and the reflecting section 31 because light passes through the reflecting section 31 two times to and back.

In this embodiment, the pixel electrode PIX of the reflecting section 31 is disposed in the vicinity of the adjacent subpixels to apply lines of electric force to the adjacent subpixels.

This arrangement of the electrode PIX allows the entire area of the reflecting section 31 to be lit, thus offering a significant advantage in improving reflectivity.

Furthermore, for monochromatic display of one subpixel, part of the adjacent subpixels can also be used for reflective display, which is very effective in improving reflectivity.

In this embodiment, there is no color filter at the boundary of the adjacent subpixels of the reflecting section 31. The elimination of the color filter at the boundary of the subpixels prevents color mixture even if lines of electric force are applied to the adjacent subpixels, thereby preventing a decrease in contrast ratio and color reproduction range.

Combining the arrangement of the pixel electrode PIX and the color-filter empty space CFLS can considerably improve the reflectivity while preventing a decrease in contrast ratio and color reproduction range.

In this embodiment, not only the reflecting section 31 but also the transmitting section 30 can be considerably improved in reflectivity while the decrease of the contrast ratio and color reproduction range is prevented by the combination of the arrangement of the pixel electrode PIX and the color-filter empty space CFLS.

Third Embodiment

Figure 15:
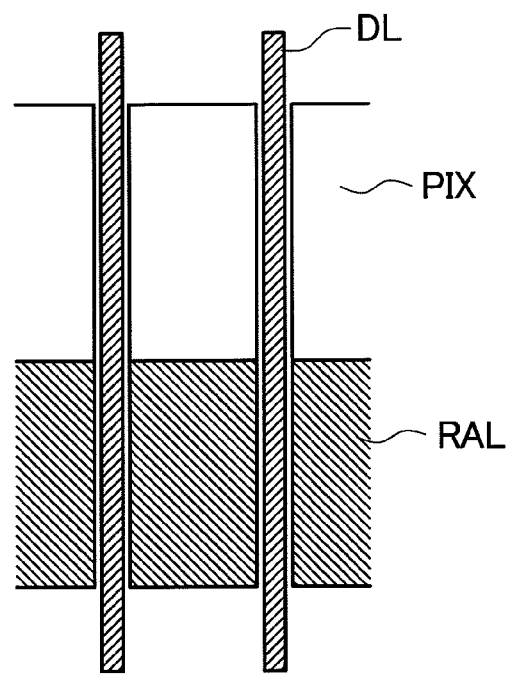
FIG. 15 is a plan view of a TFT substrate side subpixel of a partial transmissive-type liquid crystal display device according to a third embodiment of the invention.
Figure 16:
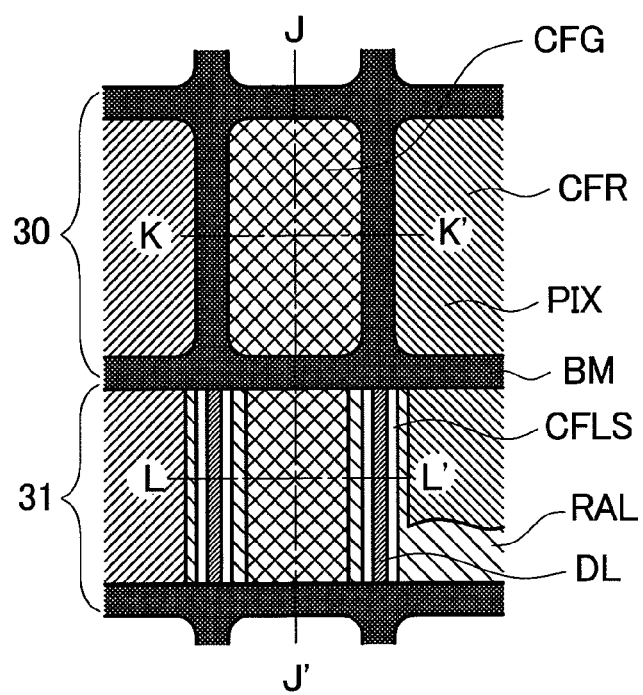
FIG. 16 is a plan view in which the TFT substrate of FIG. 15 and a CF substrate are placed one on another.
Figure 17:
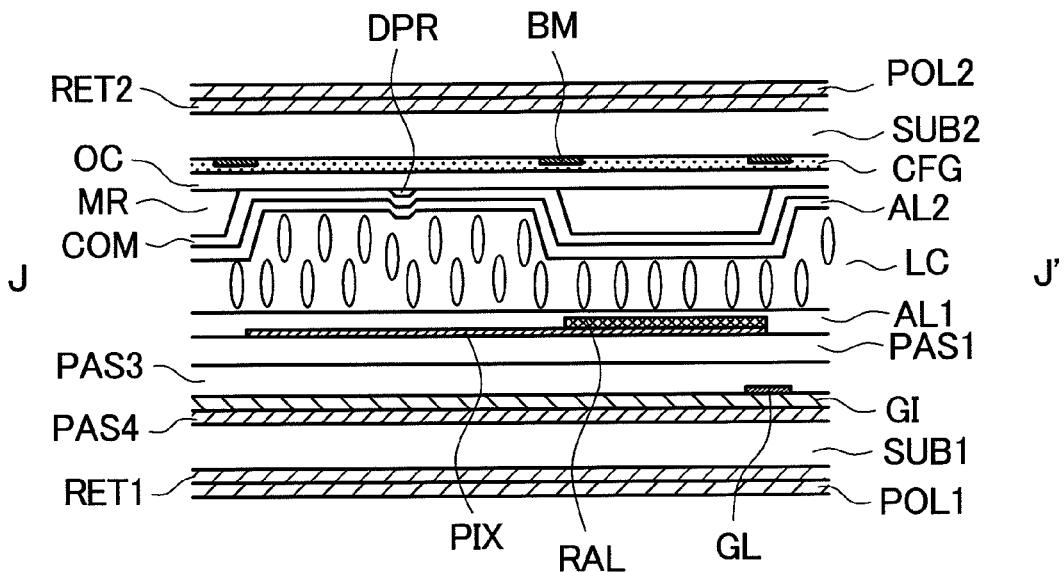
FIG. 17 is a sectional view taken along line J-J' of FIG. 16.
Figure 18:
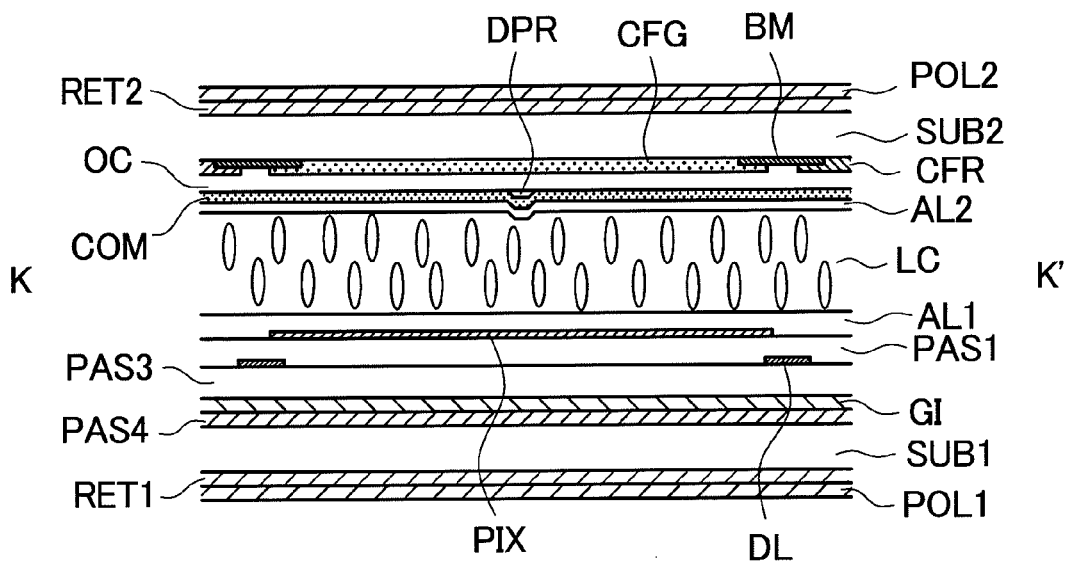
FIG. 18 is a sectional view taken along line K-K' of FIG. 16.
Figure 19:
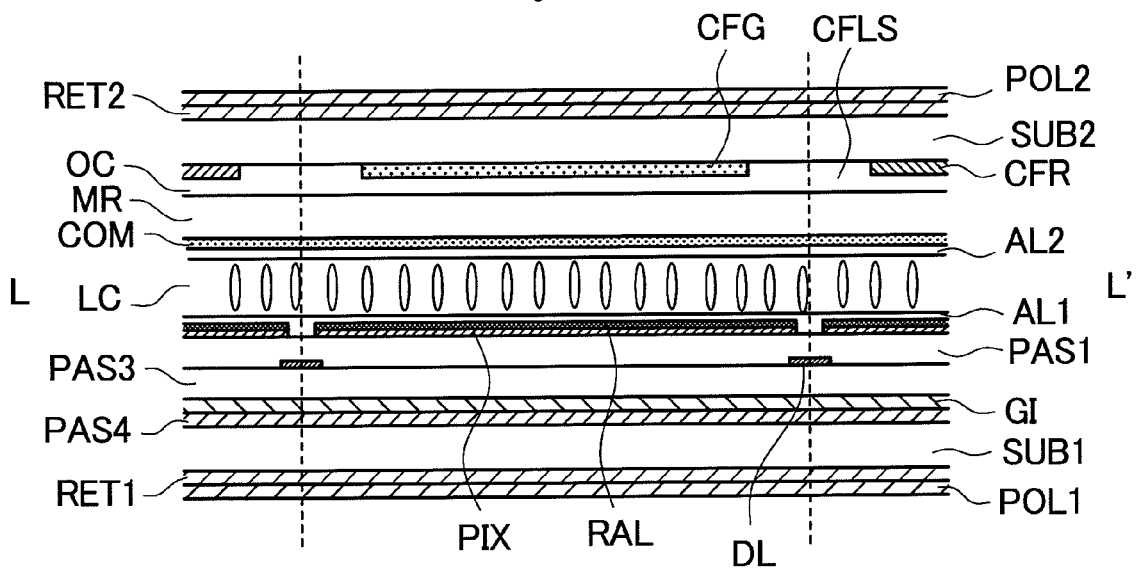
FIG. 19 is a sectional view taken along line L-L' of FIG. 16.

FIG. 15 is a plan view of a TFT substrate side subpixel of a partial transmissive-type liquid crystal display device according to a third embodiment of the invention. FIG. 16 is a plan view in which the TFT substrate of FIG. 15 and a CF substrate are placed one on another. FIG. 17 is a sectional view taken along line J-J' of FIG. 16. FIG. 18 is a sectional view taken along line K-K' of FIG. 16. FIG. 19 is a sectional view taken along line L-L' of FIG. 16.

The partial transmissive-type liquid crystal display device of this embodiment is a vertical-alignment VA (a vertical electric field mode) partial transmissive-type liquid crystal display device (with a negative dielectric anisotropy). In FIG. 16, reference numeral 30 denotes a transmitting section and 31 denotes a reflecting section.

The partial transmissive-type liquid crystal display device of this embodiment has a pair of glass substrates SUB1 and SUB2 with a liquid crystal layer LC sandwiched therebetween. This partial transmissive-type liquid crystal display device is viewed from the main surface of the glass substrate SUB2 (also referred to as a CF substrate).

The glass substrate SUB2 has, on the liquid crystal layer side, a black matrix BM, red, green, and blue color filter layers CFR, CFG, and CFB, a protection layer OC, a recessed layer MR and an orientation control projection DPR, an counter electrode COM (also referred to as a common electrode), and an alignment layer AL2 in that order from the glass substrate SUB2 to the liquid crystal layer LC. The glass substrate SUB2 also has a retarder RET2 and a polarizer POL2 on the outside.

The glass substrate SUB1 (also referred to as a TFT substrate) has, on the liquid crystal layer side, an insulating film PAS4, a gate insulating film GI, a scanning line (also referred to as a gate line) GL, an interlayer insulating film PAS3, a video line (also referred to as a source line or a drain line) DL, an interlayer insulating film PAS1, a pixel electrode PIX, a reflecting electrode RAL, and an alignment layer AL1 in that order from the glass substrate SUB1 to the liquid crystal layer LC. The glass substrate SUB1 also has a retarder RET1 and a polarizer POL1 on the outside.

In this embodiment, the planar pixel electrode PIX is provided on the glass substrate SUB1 side, while the planar common counter electrode COM is provided on the glass substrate SUB2 side, and the vertical electric field is formed between the pixel electrode PIX and the counter electrode COM to change the orientation of the liquid crystal layer LC. The initial vertical orientation of liquid crystal layer LC is tilted in the direction parallel to the substrate by the vertical electric field. The direction in which the liquid crystal molecules tilt is controlled by means for controlling the orientation, like the orientation control projection DPR.

There are the retarder RET1 and the polarizer POL1 outside the glass substrate SUB1, while there are the retarder RET2 and the polarizer POL2 outside the glass substrate SUB2. The transmitting section 30 and the reflecting section 31 show the brightness of light using the double refraction of the retarders RET1 and RET2 and the liquid crystal layer LC. The length of the cell gap of the reflecting section 31 is set at about half of that of the transmitting section 30. This is for the purpose of matching the optical path lengths of the transmitting section 30 and the reflecting section 31 because light passes through the reflecting section 31 two times to and back.

In this embodiment, the pixel electrode PIX of the reflecting section 31 is disposed in the vicinity of the adjacent subpixels to apply lines of electric force to the adjacent subpixels.

This arrangement of the electrode PIX allows the entire area of the reflecting section 31 to be lit, thus offering a significant advantage in improving reflectivity.

Furthermore, for monochromatic display of one subpixel, part of the adjacent subpixels can also be used for reflective display, which is very effective in improving reflectivity. In this embodiment, there is no color filter at the boundary of the adjacent subpixels of the reflecting section 31. The elimination of the color filter at the boundary of the subpixels prevents color mixture even if lines of electric force are applied to the adjacent subpixels, thereby preventing a decrease in contrast ratio and color reproduction range.

Combining the arrangement of the pixel electrode PIX and the color-filter empty space CFLS can considerably improve the reflectivity while preventing a decrease in contrast ratio and color reproduction range.

In this embodiment, not only the reflecting section 31 but also the transmitting section 30 can be considerably improved in reflectivity while the decrease of the contrast ratio and color reproduction range is prevented by the combination of the arrangement of the pixel electrode PIX and the color-filter empty space CFLS.

Fourth Embodiment

Figure 20:
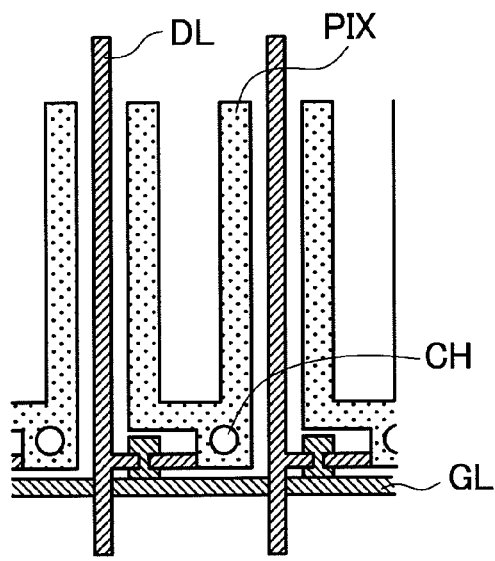
FIG. 20 is a plan view of a subpixel of a transmissive liquid crystal display device according to a fourth embodiment of the invention.
Figure 21:
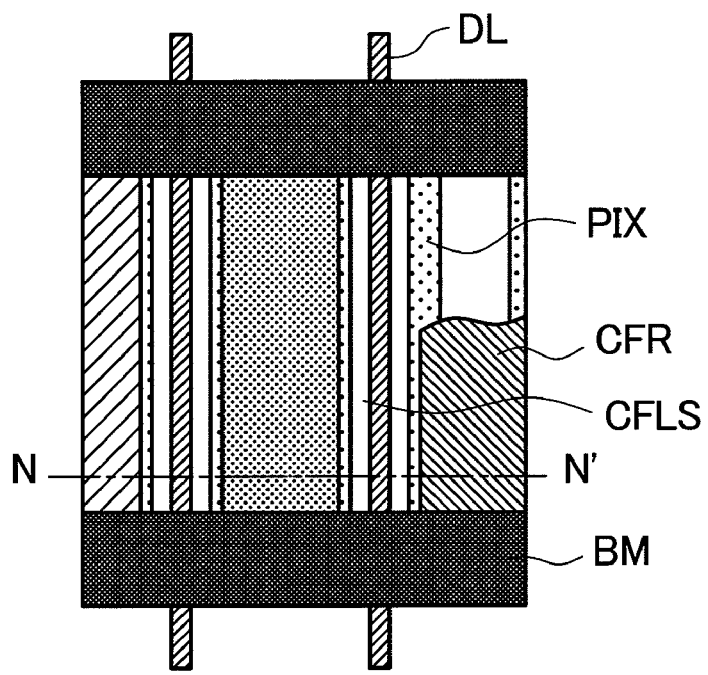
FIG. 21 is a plan view in which the TFT substrate of FIG. 20 and a CF substrate are placed one on another.
Figure 22:
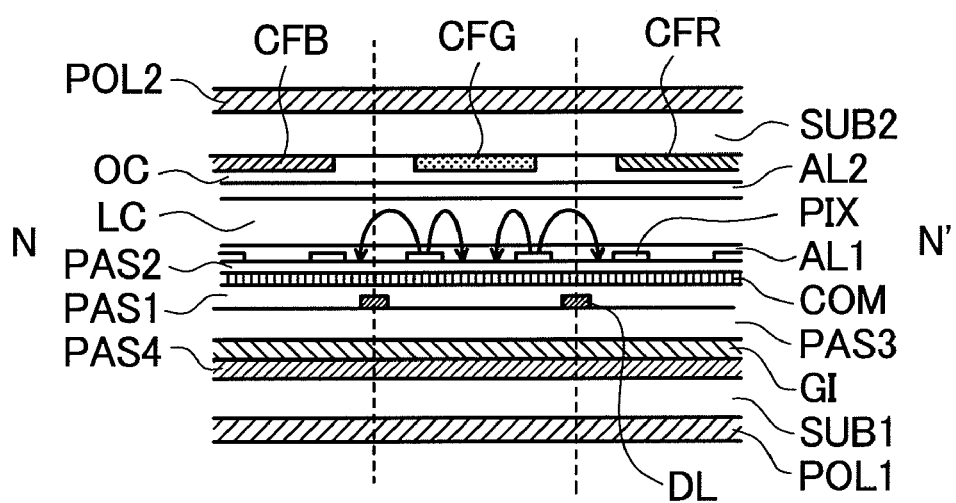
FIG. 22 is a sectional view taken along line N-N' of FIG. 21.

FIG. 20 is a plan view of a subpixel of a transmissive liquid crystal display device according to a fourth embodiment of the invention. FIG. 21 is a plan view in which the TFT substrate of FIG. 20 and a CF substrate are placed one on another. FIG. 22 is a sectional view taken along line N-N' of FIG. 21. The transmissive liquid crystal display device of this embodiment is an in-plane switching (IPS) transmissive liquid crystal display device. The transmissive liquid crystal display device of this embodiment has a pair of glass substrates SUB1 and SUB2 with a liquid crystal layer LC sandwiched therebetween. This transmissive liquid crystal display device is viewed from the main surface of the glass substrate SUB2 (also referred to as a CF substrate). In FIG. 20, reference symbol CH denotes a contact hole.

The glass substrate SUB2 has, on the liquid crystal layer side, a black matrix BM, red, green, and blue color filter layers CFR, CFG, and CFB, a protection layer OC, and an alignment layer AL2 in that order from the glass substrate SUB2 to the liquid crystal layer LC. The glass substrate SUB2 also has a polarizer POL2 on the outside.

The glass substrate SUB1 (also referred to as a TFT substrate) has, on the liquid crystal layer side, an insulating film PAS4, a gate insulating film GI, a scanning line (also referred to as a gate line) GL, an interlayer insulating film PAS3, a video line (also referred to as a source line or a drain line) DL, an interlayer insulating film PAS1, an counter electrode COM (also referred to as a common electrode), an interlayer insulating film PAS2, a pixel electrode PIX, and an alignment layer AL1 in that order from the glass substrate SUB1 to the liquid crystal layer LC. The glass substrate SUB1 also has a polarizer POLL on the outside.

In this embodiment, the comb pixel electrode PIX and the planar counter electrode COM are placed on the glass substrate SUB1 (TFT substrate) side, with the interlayer insulating film PAS1 sandwiched therebetween, in which arch electric flux lines formed between the pixel electrode PIX and the counter electrode COM are distributed in such a manner as to pass through the liquid crystal layer LC to change the orientation of the liquid crystal layer LC.

At that time, the density of the lines of electric force and the torque that adjacent lines of electric force apply to the liquid crystal layer LC are maintained in relatively good balance to enable transmissive display.

In this embodiment, the comb electrodes of the pixel electrode PIX are disposed in the vicinity of the adjacent subpixels to apply lines of electric force.

This arrangement of the comb electrodes of the electrode PIX allows the entire area of the reflecting section 31 to be lit, thus offering a significant advantage in improving transmissivity.

Furthermore, for monochromatic display of one subpixel, part of the adjacent subpixels can also be used for transmissive display, which is very effective in improving transmissivity. In this embodiment, there is no color filter at the boundary of the subpixels. The elimination of the color filter at the boundary of the subpixels prevents color mixture even if lines of electric force are applied to the adjacent subpixels, thereby preventing a decrease in contrast ratio and color reproduction range.

Combining the arrangement of the comb electrodes of the pixel electrode PIX and the color-filter empty space CFLS can considerably improve the transmissivity while preventing a decrease in contrast ratio and color reproduction range. In order to improve transmissivity, it is preferable that at least one of the comb electrodes of the pixel electrode PIX be disposed in the color-filter empty space CFLS.

This is because the edge of the comb electrodes of the pixel electrode PIX has the highest transmission efficiency, and arranging at least the edge of the electrode in the color-filter empty space CFLS improves the transmission efficiency.

While the invention has been described in its preferred embodiments, it is to be understood that the invention is not limited to those and various modifications may be mad without departing from the spirit and scope of the invention.

What is claimed is:

1. A liquid crystal display device including a liquid crystal display panel having a pair of substrates and liquid crystal sandwiched between the pair of substrates, the liquid crystal display panel including a plurality of subpixels, the plurality of subpixels each comprising an active element, a pixel electrode, and a counter electrode, in which an electric field is generated by the pixel electrode and the counter electrode to drive the liquid crystal, the liquid crystal display device comprising:
    a light-shielding film;
    a color filter, the light shielding film and the color filter being formed on a first substrate of the pair of substrates; and
    a scanning line and a video line for supplying the active element with a scanning voltage and a video voltage, respectively, the scanning line and the video line being formed on a second substrate of the pair of substrates;
    wherein each of the subpixels includes a transmissive section and a reflective section;
    wherein the plurality of subpixels include a first subpixel and a second subpixel which is adjacent to the first subpixel in a direction extending along the scanning line;
    wherein the transmissive section of the first subpixel borders the transmissive section of the second subpixel and the reflective section of the first subpixel borders the reflective section of the second subpixel;
    wherein there exists a region where both the light-shielding film and the color filter are not disposed on the first substrate;
    wherein the region lies between an area corresponding to the pixel electrode of the reflective section of the first subpixel and an area corresponding to the pixel electrode of the reflective section of the second subpixel; and
    wherein there is no such region between an area corresponding to the pixel electrode of the transmissive section of the first subpixel and an area corresponding to the pixel electrode of the transmissive section of the second subpixel.

2. The liquid crystal display device according to claim 1, wherein
    the pixel electrode includes a plurality of comb electrodes; and
    at least one of the plurality of comb electrodes is disposed in the region.

3. The liquid crystal display device according to claim 1, wherein
    the pixel electrode includes a plurality of comb electrodes; and
    a distance between the comb electrode of the plurality of comb electrodes closest to the video line and the center of the video line is within 6 µm when viewed in plan view.

4. The liquid crystal display device according to claim 3, wherein
    the distance between the comb electrode of the plurality of comb electrodes closest to the video line and the center of the video line is within 5 µm.

5. The liquid crystal display device according to claim 4, wherein
    the distance between the comb electrode of the plurality of comb electrodes closest to the video line and the center of the video line is within 4 µm when viewed in plan view.

6. The liquid crystal display device according to claim 1, wherein the pixel electrode and the counter electrode are formed on the second substrate.

7. The liquid crystal display device according to claim 1, wherein
    the pixel electrode and the counter electrode are formed on the second substrate; and
    the counter electrode comprises a reflective electrode.

8. The liquid crystal display device according to claim 1, wherein
    the pixel electrode and the counter electrode are formed on the second substrate;
    the counter electrode has a reflective portion which comprises a reflective electrode; and
    the first substrate has a layer in another region facing the reflective section, and the layer is not disposed in the transmissive section.

9. The liquid crystal display device according to claim 8, wherein the first substrate has an optical element that controls the polarization of light in the another region facing the reflective section.

10. The liquid crystal display device according to claim 7, wherein the reflective electrode is made of a metal film formed on a part of the counter electrode.

11. The liquid crystal display device according to claim 6, further comprising
an interlayer insulating film on the counter electrode, wherein
the pixel electrode is formed on the interlayer insulating film.

12. The liquid crystal display device according to claim 1, wherein
the pixel electrode is formed on the second substrate; and
the counter electrode is formed on the first substrate.

13. The liquid crystal display device according to claim 12, wherein
the pixel electrode is formed on the second substrate;
the counter electrode is formed on the first substrate;
the counter electrode has a reflective portion which comprises a reflective electrode; and
the first substrate has a layer in another region facing the reflective section, and the layer is not disposed in the transmissive section.

* * * * *